April 11, 1967 J. B. LEDDY 3,313,057

COLOR CODE CAPS FOR KNOBS

Filed Oct. 26, 1964

INVENTOR.
JOHN B. LEDDY

BY Julian Caplan
ATTORNEY

United States Patent Office 3,313,057

Patented Apr. 11, 1967

3,313,057

COLOR CODE CAPS FOR KNOBS

John B. Leddy, San Mateo, Calif., assignor to Lloyd A. Griffith, Burlingame, Calif.

Filed Oct. 26, 1964, Ser. No. 406,497
5 Claims. (Cl. 40—331)

This invention relates to new and improved color code caps for knobs. More particularly, the invention relates to discs which may be inserted in the exposed ends of knobs such as those used on electronic equipment, the knobs being of distinctive colors or otherwise marked to distinguish from adjacent knobs.

A particular feature and advantage of the present invention is the provision of a separable plastic disc which may be installed in a suitable recess in the end of the knob so constructed that the disc may be removed from time to time or different discs substituted as conditions of the equipment on which the knobs are installed changed or, alternatively, the disc may be left in the knob permanently.

A particular feature of the invention is the simplicity of the construction of the knob and the disc which facilitates installation and removal of the discs.

A still further feature of the invention is the construction of the disc in such manner that when installed it blends into the structure of the knob with smooth flowing lines so that there is no likelihood of the disc being unintentionally dislodged, nor are there any attachment means which interfere with the operation of the knob or its manufacture or which detract from the appearance of the knob after the disc has been removed.

Other objects of the present invention will become apparent upon reading the following specification and referring to the accompanying drawings in which similar characters of reference represent corresponding parts in each of the several views:

Figure 4:
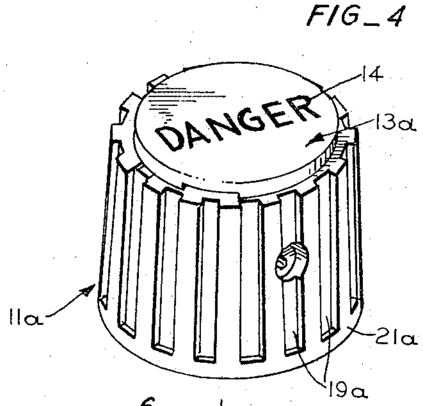
FIG. 4 is a perspective view of assembled disc and knob with a disc modified to exhibit indicia.

The knob 11 shown in the accompanying drawings is of a type suitable for control panels of electronic equipment. The details of construction thereof are subject to some modification. Preferably, the knob is molded of a plastic material which is impact resistant. Such a material is one manufactured by the Marbon Chemical Co., Division of Borg-Warner Corporation, under the trade name "Cycolac," an acrylonitrile-butadiene-styrene material. Such a material is not susceptible to chipping, breaking or cracking. An insert 12 is generally formed in the knob which may be of corrosion-treated aluminum. In accordance with this invention, knob 11 is of a black or grey color. Disc 13, which is inserted in the end of knob 11, as hereinafter set forth in detail, is made of the same material as knob 11, but is colored with pigment to attract attention. As shown in FIG. 4, a modified disc 13*a* may have indicia 14 displayed thereon in addition to being of a distinctive color.

As has been mentioned, knob 11 is subject to a certain amount of modification. In the form herein illustrated, there is provided a top disc 16 having an annular rim 17 at the end facing the operator. Depending from disc 16 is an outwardly tapering skirt 18 the exterior of which is formed with indented flutes 19 which facilitate gripping the knob. Flutes 19 terminate spaced upwardly from the bottom edge of skirt 18 to provide a circumferential bottom ring 21. In the form of the invention shown in FIGS. 1 to 3, the skirt 18 is provided with a pair of opposed longitudinal thin bars 22 having upper ends 23 flush with the upper edge of rim 17 and bottom edge 24 flush with the bottom edge of lower rim 21.

Aluminum insert 12 is annular with the top and bottom outside corners 26, 27, bevelled (see FIG. 3) and the skirt 18 is formed to fit the shape of insert 12 so that the two parts cannot be separated. Preferably there is a cavity 28 in the bottom of skirt 18 of a diameter greater than the opening 29 in insert 12. A shaft (not shown) of the equipment in which the knob is installed fits into opening 29. A pair of recessed head setscrews 31 is threaded through insert 12 to bear against such shaft and in order to enable the installer to obtain access to screws 31, holes 32 are formed in the exterior of skirt 18.

The top edge 36 of rim 17 is planar and transverse to the axis of the knob. The wall 37 on the inside of rim 36 is as close to cylindrical as is possible within ordinary manufacturing techniques.

Disc 13, which, as has been stated, is preferably of a distinctive color contrasting with color of knob 11, has a skirt 41 of an outside diameter slightly less than the inside diameter of wall 37 and of a height approximately equal to the depth of the wall 37. A plurality of detents 42 is formed integrally on the exterior of skirt 41, said detents gripping tightly against wall 37 when disc 13 is installed in place. Top disc portion 43 has an outside diameter slightly less than that of rim 36 and the corner edge 44 is rounded to merge into top surface 36. Preferably, at two diametrically opposed locations the underside of disc portion 43 is formed with a groove 46 to accommodate the fingernail of the installer. Hence, when it is necessary to remove disc 13 the fingernail or a prying instrument may be inserted in groove 46 under the outer edge of disc 43 and thereby the cap 13 removed.

In order to assemble disc 13 on knob 11, it is merely necessary to insert skirt 41 inside rim 17 and to apply a slightly downward pressure which locks the cap 13 in place with detents 42 gripping against the sidewall 37. Thus, the cap 13 remains in place despite considerable usage of the knob and normal jarring of the equipment. When it is desired to remove disc 13 or to change discs, the disc may be pried out of its socket as has been described. When thus removed, there is no marring of the appearance of the knob 11.

Figure 5:
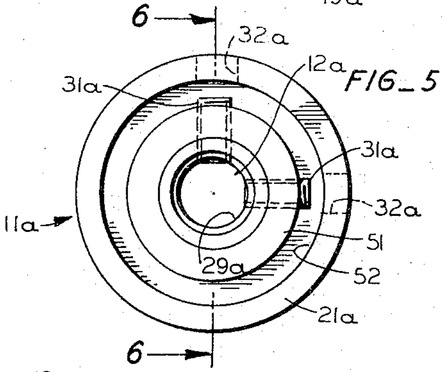
FIG. 5 is a bottom plan view of the structure of FIG. 4.
Figures 6, 7:
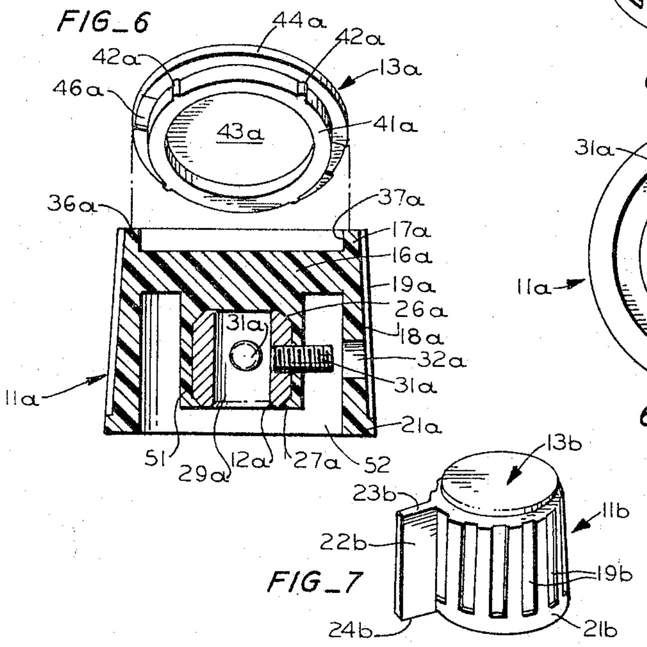
FIG. 6 is a sectional view taken substantially along the line 6—6 of FIG. 5 and showing in perspective the cap removed.
FIG. 7 is a view similar to FIG. 4 of a knob of modified construction.

FIGS. 4 to 6 illustrate a somewhat modified knob 11*a* as well as a partially modified cap 13*a* bearing indicia 14 as has been described. As best shown in FIG. 6, the number of detents 42*a* on cap 13*a* may vary from the corresponding detents of cap 13 of FIG. 1.

Figure 3:
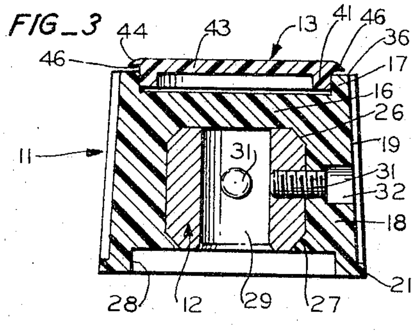
FIG. 3 is a vertical sectional view substantially along the line 3—3 of FIG. 2 showing the disc and knob assembled.

With respect to knob 11*a*, skirt 18*a* is thin as compared with the corresponding skirt in FIG. 3. An inner skirt 51 depends from central disc 16*a* and is separated from skirt 18*a* by an annular groove 52. Metal insert 12*a* fits in inner skirt 51. In other respects, the knobs 11 and 11*a* are substantially the same and corresponding parts in the modification of FIGS. 4 to 6 are marked with the same reference numeral followed by the subscript *a*.

Figure 1:
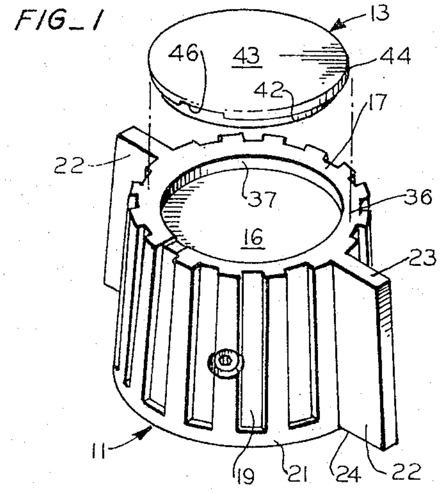
FIG. 1 is an exploded perspective to the disc.
Figure 2:
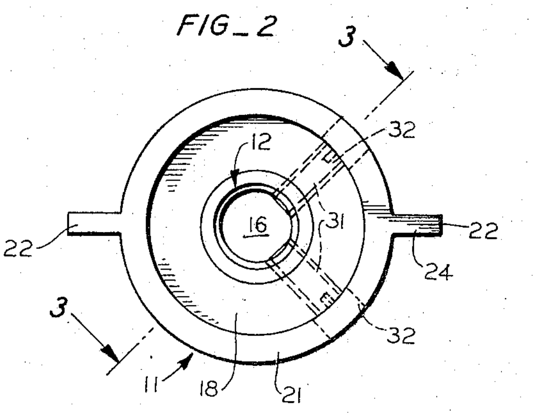
FIG. 2 is a bottom plan view of the knob.

FIG. 7 is similar in construction to FIG. 1 except that there is a single bar 22*b* on knob 11*b*. In other respects, the parts are the same and corresponding parts are provided with the same reference numeral as in FIGS. 1 to 3 followed by the subscript *b*.

What is claimed is:

1. In combination, a knob for electronic equipment formed with a substantially planar top and an upstanding peripheral rim having an inner, substantially cylindrical wall, and a coding cap having a disc of lesser diameter than said rim, the underside of the periphery of said cap disc resting upon the top of said rim, a depending annular, flexible, cylindrical skirt, and a plurality of detents on the exterior of said skirt, said detents of short arcuate length and bearing tightly against the inside of said rim, the underside of said cap disc formed with cut-away portions outside said skirt to facilitate prying said cap off said knob.

2. The combination of claim 1 in which said cap is of a contrasting color from said knob and displays identifying indicia.

3. The combination of claim 1 in which the axial length of said skirt is substantially equal to the height of said rim, the bottom of said disc being spaced from said top.

4. The combination of claim 1 in which said knob is formed with a second skirt depending from said top and blending with said rim, the exterior of said second skirt being fluted.

5. The combination of claim 4 in which the exterior of said second skirt and said rim are conical.

References Cited by the Examiner

UNITED STATES PATENTS

| | | | |
|---|---|---|---|
| 3,010,743 | 11/1961 | Bengtson | 40—332 X |
| 3,024,555 | 3/1962 | Abeles | 40—331 |
| 3,061,869 | 11/1962 | Scalo et al. | 16—121 |
| 3,096,115 | 7/1963 | Patriquin et al. | 16—121 X |

FOREIGN PATENTS

| | | |
|---|---|---|
| 712,531 | 7/1931 | France. |

EUGENE R. CAPOZIO, *Primary Examiner.*

W. H. GRIEB, *Assistant Examiner.*